United States Patent
Aziz et al.

(10) Patent No.: US 8,014,457 B2
(45) Date of Patent: Sep. 6, 2011

(54) METHOD OF PROVIDING A DATA SIGNAL FOR CHANNEL ESTIMATION AND CIRCUIT THEREOF

(75) Inventors: Ahsan U. Aziz, Austin, TX (US); Leo G. Dehner, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 627 days.

(21) Appl. No.: 12/183,762

(22) Filed: Jul. 31, 2008

(65) Prior Publication Data

US 2008/0304605 A1  Dec. 11, 2008

Related U.S. Application Data

(63) Continuation-in-part of application No. 11/589,877, filed on Oct. 31, 2006, now Pat. No. 7,684,504.

(51) Int. Cl.
  *H04K 1/10* (2006.01)
(52) U.S. Cl. ........ 375/260; 375/267; 375/316; 375/342; 375/343; 375/350; 375/355; 375/362; 370/203; 370/208; 370/210; 455/59
(58) Field of Classification Search .................. 375/260, 375/267, 316, 342–343, 344, 350, 355, 362; 455/59–60; 370/203, 208, 210
  See application file for complete search history.

(56) References Cited

U.S. PATENT DOCUMENTS

| | | | |
|---|---|---|---|
| 6,185,251 B1 * | 2/2001 | Fertner | 375/231 |
| 6,754,170 B1 | 6/2004 | Ward | |
| 7,139,320 B1 * | 11/2006 | Singh et al. | 375/260 |
| 7,400,573 B2 * | 7/2008 | Sundstrom et al. | 370/208 |
| 7,852,958 B2 * | 12/2010 | Kisoda et al. | 375/260 |
| 2003/0016773 A1 | 1/2003 | Atungsiri et al. | |
| 2003/0123383 A1 | 7/2003 | Korobkov et al. | |
| 2005/0286465 A1 | 12/2005 | Zhuang | |

FOREIGN PATENT DOCUMENTS

WO  2005081481 A1  9/2005

OTHER PUBLICATIONS

International Search Report and Written Opinion related to PCT/US07/77172, dated Mar. 19, 2008. MacLeod, M.D., Fast interpolation by FFT with greatly increased adcuracy; Electronics Letters, Jun. 24, 1993; vol. 29, No. 13.
Hawkins, William G., FFT interpolation for arbitrary factors: A comparison to cubic spline interpolation and linear interpolation, 0-7803-2544 pp. 1433-1437.
Antipolis, Sophia, EUTRA Downlink numerology and design, Jun. 20-21, 2005.

* cited by examiner

*Primary Examiner* — Chieh M Fan
*Assistant Examiner* — Sophia Vlahos
(74) *Attorney, Agent, or Firm* — Kim Marie Vo; James L. Clingan, Jr.

(57) ABSTRACT

A received signal having pilots is converted to a first signal in the frequency domain having the pilots. The pilots are extracted from the first signal to obtain extracted pilots to form a second signal. The second signal is used to provide a first estimate of a channel. The first estimate is converted to the time domain. Noise is removed from the first estimate in the time domain to provide a second estimate of the channel in the time domain. An autocorrelation of the channel in the frequency domain is determined using the second estimate of the channel. Extension signals are determined using the autocorrelation. The extension signals are appended to the first estimate of the channel to obtain a third estimate of the channel. The third estimate is used to provide a data signal in the frequency domain.

20 Claims, 8 Drawing Sheets

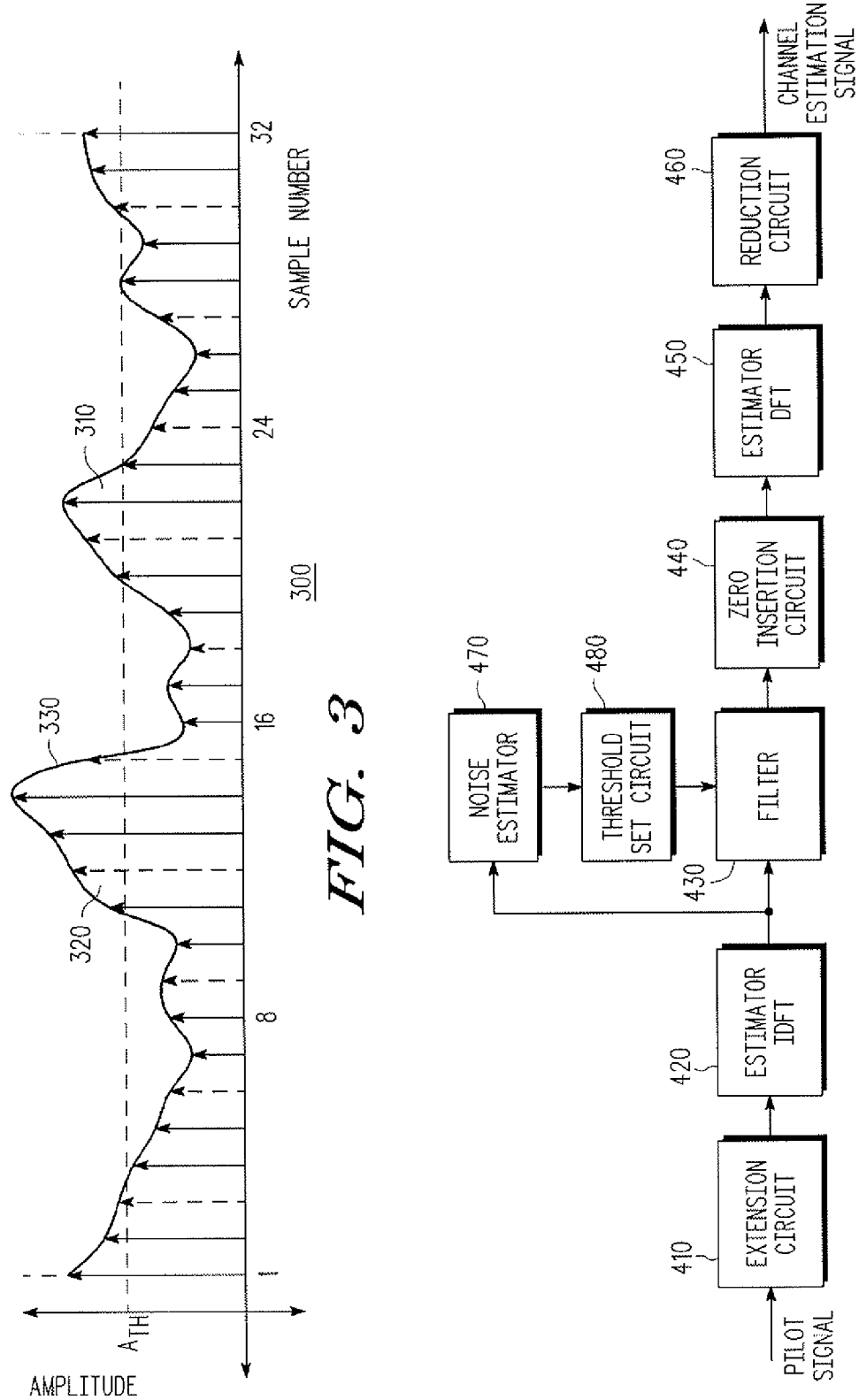

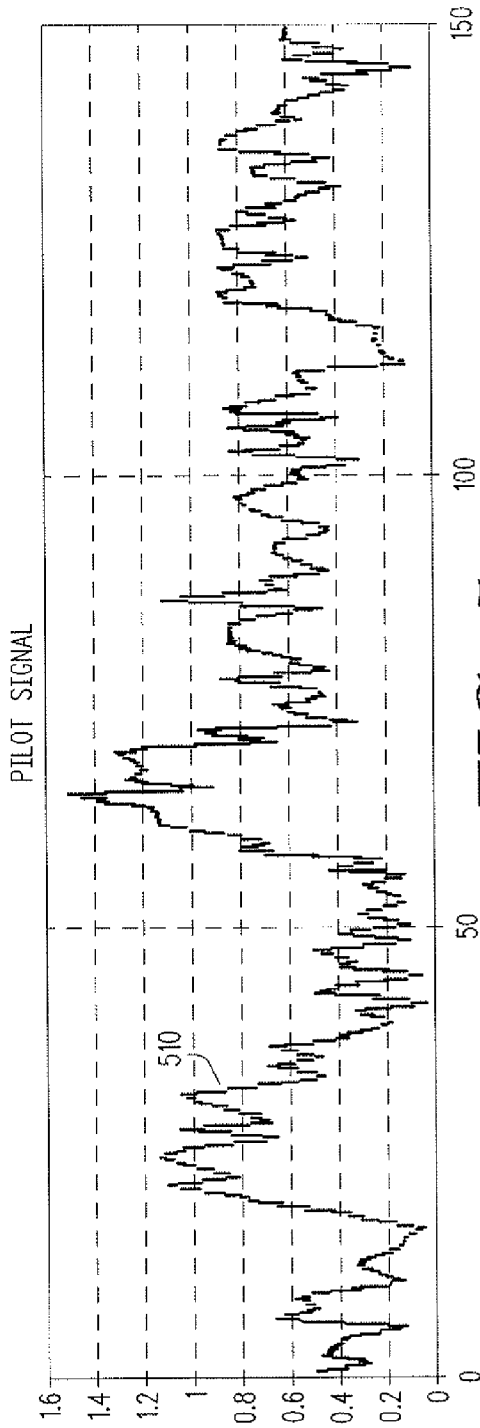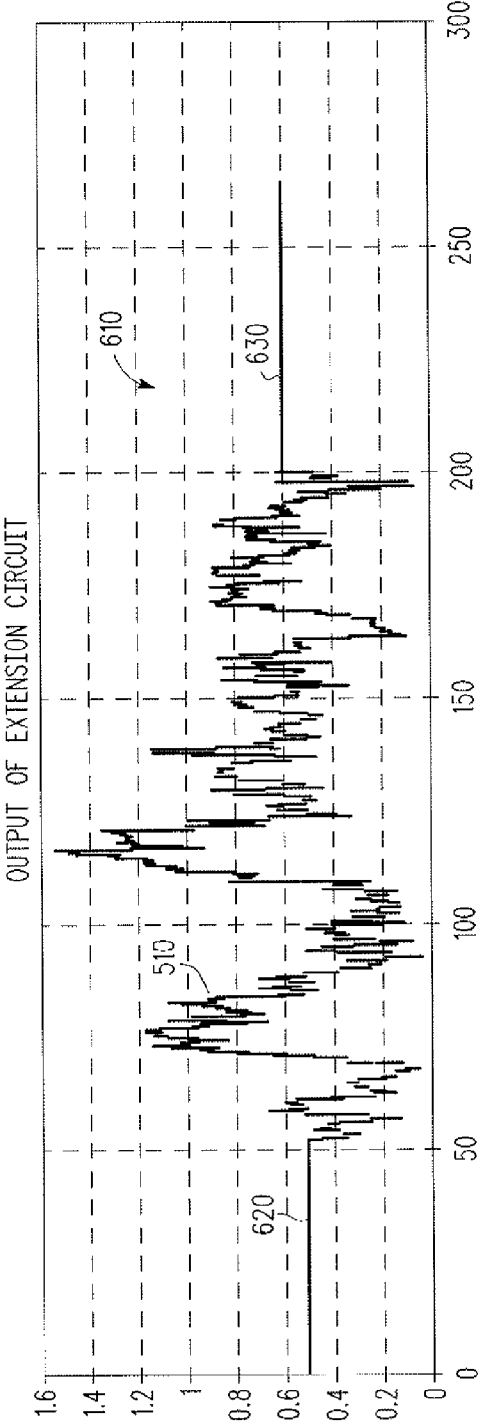

METHOD OF PROVIDING A DATA SIGNAL FOR CHANNEL ESTIMATION AND CIRCUIT THEREOF

CROSS-REFERENCE TO RELATED APPLICATION

This application is a continuation-in-part of U.S. patent application Ser. No. 11/589,877, filed on Oct. 31, 2006, entitled "SYSTEM AND METHOD FOR REDUCING EDGE EFFECT," naming Ahsan Aziz as the inventor, and assigned to the current assignee hereof.

FIELD OF THE INVENTION

The present invention relates in general to a system and method to improve channel estimation in an orthogonal frequency division multiplexed (OFDM) transmission system. In particular it relates to a system and method for reducing the edge effect of OFDM signals.

BACKGROUND OF THE INVENTION

In an orthogonal frequency division multiplexed (OFDM) transmission system an available frequency band is divided into multiple smaller frequency bands. Multiple signals are then modulated and simultaneously transmitted on these multiple frequency bands.

Possible modulation schemes used with OFDM include binary phase shift keying (BPSK), in which one bit is encoded to each symbol, quadrature phase shift keying (QPSK), in which two bits are encoded to each symbol, or even a quadrature amplitude modulation (QAM) scheme in which multiple bits are encoded to each symbol.

In order to simplify the design of transceivers, symbol modulation in an OFDM device is often performed in the frequency domain. Then, prior to transmission, an inverse discrete Fourier transform (IDFT) is performed on the signal to move it into the time domain, where it can be transmitted as appropriate radio frequency (RF) signals. Likewise, when a transceiver receives signals in the time domain, it performs a discrete Fourier transform (DFT) on the signals to move the signal back into the frequency domain for symbol demodulation and data extraction.

Ideally, the signal received by a receiver device will be the same in amplitude as the signal transmitted by a transmitter device. However, in any kind of fading channel, such as a wireless transmission channel, the amplitude of a received signal will vary based on the particular properties of the channel. For example, signal interference can reduce the power of a received signal, while multipath reflections can increase the power of the received signal.

In many OFDM systems, therefore, the receiver will perform a channel estimation process to determine the effect that the channel has on a received signal. Based on this channel estimation, the receiver can then determine how to compensate the received signal for channel fading in order to retrieve the originally-transmitted signal.

One way this can be accomplished is if the receiver knows at least part of the received signal ahead of time. Unfortunately, transmitted data is typically unpredictable, so it can't be used for this purpose. However, one solution is to embed a known symbol pattern into the transmitted signal in place of some data. By examining the effect of the channel on the known portion of the signal, the receiver can estimate the effect of the channel on the entire signal, allowing it to determine how to compensate for the channel effect.

Some channel estimation circuits can include DFTs and IDFTs. But the circuit design for many DFTs and IDFTs can be comparatively complicated and expensive, making the design of the channel estimation circuit containing such a DFT or IDFT likewise complicated and expensive. One type of DFT and IDFT that is relatively simple, however, is a fast Fourier transform (FFT) and inverse fast Fourier transform (IFFT) used for powers of two. The expense and complication of the DFT and IDFT circuits can be limited by using FFT and IFFT circuits for powers of two.

But requiring the use of an FFT or IFFT either limits the choice of a known signal portion to signal portions whose lengths are powers of two, which may unduly limit their design, or requires that signal samples be passed through an FFT and IFFT despite the fact that they do not have the proper number of samples. Also in general, performing FFT/IFFT on blocks of non periodic data causes "edge effect" also known as "Gibbs phenomenon" this can cause significant disruption of the accuracy of the channel estimation.

Therefore, it would be desirable to provide a method and circuit for channel estimation that improves the accuracy of channel estimation by, for example, reducing edge effects.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

FIG. 3 is a graph of the received encoded symbol stream of FIG. 1, according to disclosed embodiments;

FIG. 4 is a block diagram of the channel estimation circuit of FIG. 1, according to disclosed embodiments;

FIG. 5 is as graph of a pilot signal input signal to the extension circuit of FIG. 4, according to disclosed embodiments;

FIG. 6 is as graph of an output signal from the extension circuit of FIG. 4, according to disclosed embodiments;

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best implemented in integrated circuits (ICs), and in particular through the use of circuits involving CMOS transistors. It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs, if any, will be limited to the essentials with respect to the principles and concepts used by the exemplary embodiments.

OFDM System

An orthogonal frequency division multiplexing (OFDM) system employing a channel estimation circuit is provided that allows for any size known signal portion. In this system, data is sent across a transmission medium in signals that are divided into data slots, each data slot containing a set number of bits of data.

Figure 1:
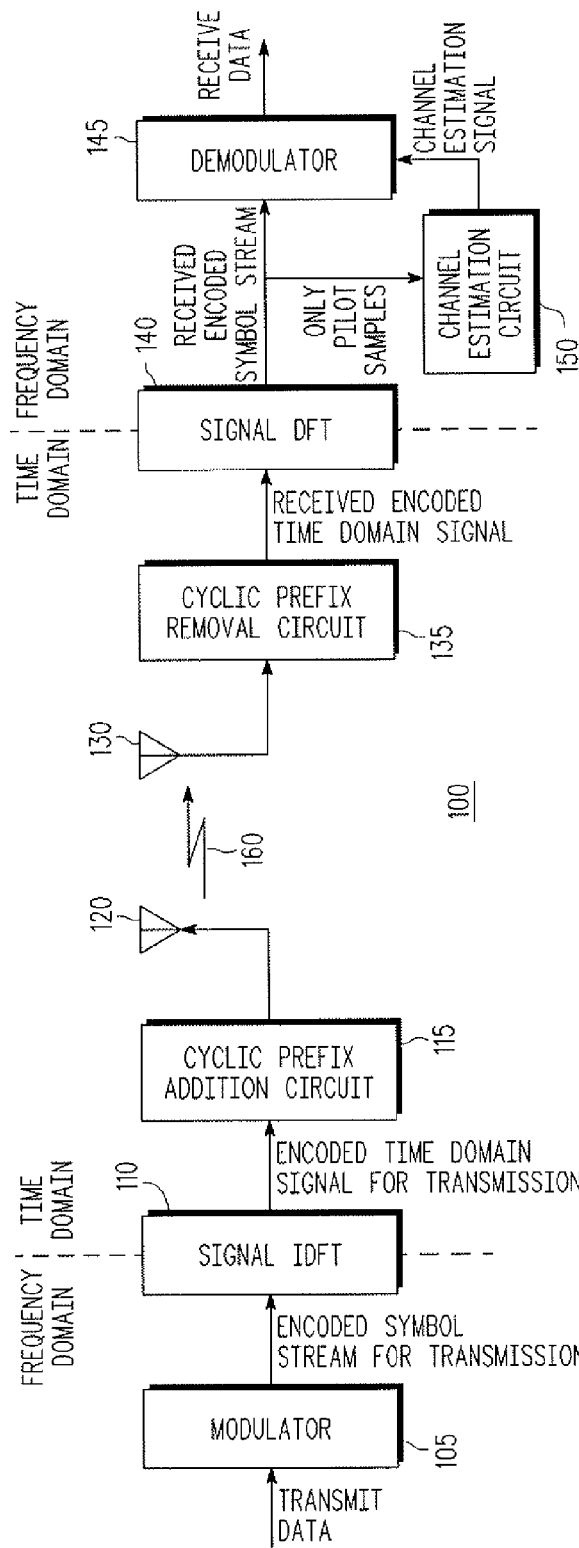
FIG. 1 is a block diagram of an OFDM transmission system, according disclosed embodiments.

FIG. 1 is a block diagram of an OFDM system, according disclosed embodiments. As shown in FIG. 1, the OFDM system 100 includes a modulator 105, a signal inverse discrete Fourier transform (IDFT) circuit 110, a cyclic prefix addition circuit 115, a transmitter antenna 120, a receiver antenna 130, a cyclic prefix removal circuit 135, a signal discrete Fourier transform (DFT) circuit 140, a demodulator 145, and a channel estimation circuit 150. The modulator 105, signal IDFT circuit 110, cyclic prefix addition circuit 115, and transmitter antenna 120 form a transmitter within the OFDM system 100; and the receiver antenna 130, cyclic prefix removal circuit 135, signal DFT circuit 140, demodulator 145, and channel estimation circuit 150 form a receiver within the OFDM system 100.

The modulator 105 receives a set of transmit data, including multiple data bits, and encodes those data bits into a plurality of symbols that are placed in an encoded symbol stream for transmission. In addition to data symbols, however, the encoded symbol stream for transmission will also include a plurality of pilot symbols whose value and position are known to both the transmitter and the receiver.

Figure 2:
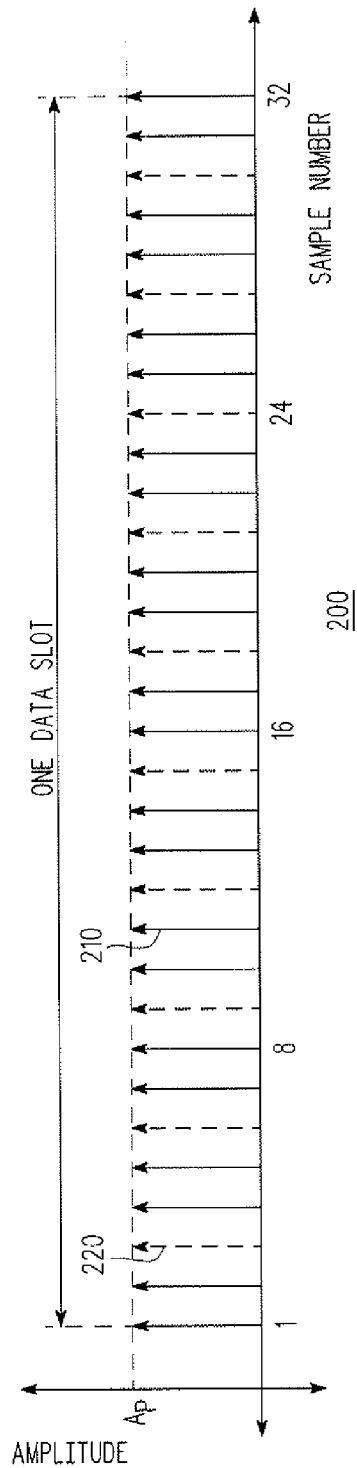
FIG. 2 is a graph of the encoded symbol stream for transmission of FIG. 1, according to disclosed embodiments.

FIG. 2 is a graph of the encoded symbol stream for transmission of FIG. 1, according to disclosed embodiments. As shown in FIG. 2, the encoded symbol stream for transmission for a given data slot 200 includes a series of symbols made up of data symbols 210 and pilot symbols 220.

The data symbols 210 are symbols that encode the data that is to be sent to a receiving device. These data symbols 210 could be modulated according to a variety of modulation schemes (e.g., BPSK QPSK, M-QAM, etc.) so the number of data bits encoded in each data symbol 210 could vary according to the embodiment.

The pilot symbols 220 represent a known signal pattern. In a given system 100, both a transmitter and receiver will know the values and placement of the pilot symbols 220 in a given data slot 200. This allows the receiver to know beforehand what at least a portion of the transmitted data slot 200 should have looked like at transmission.

The particular embodiment disclosed in FIG. 2 shows a data slot 200 having 32 symbols, with two out of every three symbols being a data symbol 210, and every third symbol being a pilot symbol 220. Thus, in this embodiment every data slot has 22 data symbols and 10 pilot symbols. However, the size of the data slot 200 and the position and frequency of the pilot symbols 220 can change according to individual embodiments.

Typically, the decision regarding the percentage of the data slot to devote to pilot symbols involves a tradeoff between channel estimation and data rate. The minimum number of pilots used needs to at least satisfy Nyquist sampling rate in order to reconstruct the channel for the pilots.

In addition, to ensure that the pilot symbol portion of the data slot 200 will provide an adequate estimation of the entire channel, it is necessary for the frequency of the pilot symbols 220 to meet the Nyquist sampling rate with respect to the channel coherence bandwidth. In particular, the frequency of the pilot symbols 220 must be at least half the channel coherence bandwidth. For example, if the delay spread of a channel is 5 μs, the coherence bandwidth is the inverse of the delay spread, i.e., $$\frac{1}{5 \text{ μs}} = 0.2 \text{ MHz}.$$

The sampling rate of this channel thus needs to be at least half of the coherence bandwidth, $$\left(\text{i.e., } \frac{0.2 \text{ MHz}}{2} = 0.1 \text{ MHz}\right),$$

to meet the requirement of a Nyquist sampling rate. In an embodiment in which the subcarrier spacing was 15 KHz, this would mean that at least every sixth carrier would need to be a pilot (i.e., $$\frac{0.1 \text{ MHz}}{15 \text{ KHz}} = 6.66,$$

rounded down to 6)

As shown in FIG. 2, each of the data symbols 210 and pilot symbols 220 have a known pulse amplitude $A_P$. In the embodiment of FIG. 2 they are all at the same fixed amplitude. However, in alternate embodiments a variable amplitude could be used.

In the embodiment of FIG. 2, the pilot symbols 220 are evenly distributed throughout the data slot, i.e., they are provided as every third symbol. Having an even distribution allows for a more accurate channel estimation because the pilot symbols follow almost exactly the same distribution as the data symbols. However, in alternate embodiments the distribution need not be exactly even. The pilot symbols may be distributed in any desired pattern throughout the data slot 200. For example, in one embodiment some pilots are fixed in location (i.e., at a fixed time during a data slot), while others vary in location (i.e., are spread out over the data slot), creating unequally spaced pilots. In such an embodiment the equally spaced pilots are typically used for channel estimation while the fixed pilots are used for estimation of frequency/timing/doppler etc.

In the embodiment of FIG. 2, because the total number of symbols in one data slot 200 is a power of two, the system 100 can implement the signal IDFT circuit 110 as an inverse fast Fourier transform (IFFT) circuit, and can implement the signal DFT 140 circuit as a fast Fourier transform (FFT) circuit. In alternate embodiments, however, the total of samples in one data slot may be a value other than a power of two. However, when the slot size is not a power of two, the signal IFFT 110 and signal FFT 140 would have to be implemented with another kind of discrete Fourier transform circuit and inverse discrete Fourier transform circuit pair.

The signal IDFT circuit 110 performs an inverse discrete Fourier transform operation on the encoded symbol stream for transmission, converting it from the frequency domain to the time domain, to generate an encoded time domain signal for transmission. Although an IDFT circuit 110 is shown generally in the system of FIG. 1, in any embodiment in which a data slot contains a total number of symbols that is a power of two, the IDFT circuit 110 can be implemented as an inverse fast Fourier transform (IFFT), which is generally easier and cheaper to implement than other kinds of IDFT circuits.

The cyclic prefix addition circuit 115 adds a cyclic prefix to the beginning of each data slot, thereby extending the effective length of that data slot. The cyclic prefix extends the length of the data slot and allows the next symbol to be intersymbol interference free. This cyclic prefix is typically a repeated portion from the end of the data slot.

The length of the cyclic prefix is selected depending upon the delay spread of the multipath channel for the target application. It should preferably be at least as long as the channel delay spread or close to it in order to prevent/reduce inter symbol interference (ISI). The length of the cyclic prefix is sometimes called a guard interval.

After the cyclic prefix is added, the transmitter antenna 120 then transmits the encoded time domain signal, with cyclic prefix, as a transmitted signal 160 across a fading medium. The receiver antenna 130 in turn receives the transmitted signal 160, generally as a sum of plurality of multipath versions, each separated in phase, and time provides it to the remainder of the receiver.

The cyclic prefix removal circuit 135 operates on the received signal to remove the cyclic prefix and extract a received encoded time domain signal.

The signal DFT circuit 140 performs a discrete Fourier transform (DFT) on the received encoded time domain signal to convert it from the time domain into the frequency domain, to generate a received encoded symbol stream. As with the IDFT circuit 110, although a DFT circuit 140 is shown generally in the system of FIG. 1, in any embodiment in which a data slot contains a number of symbols that is a power of prime numbers, the DFT circuit 140 can be implemented as a fast Fourier transform (FFT), which is generally easier and cheaper to implement than other kinds of DFT.

FIG. 3 is a graph of the received encoded symbol stream of FIG. 1, according to disclosed embodiments. As shown in FIG. 3, the received encoded symbol stream in a received data slot 300 includes a series of samples made up of data samples 310 and pilot symbols 320. The pattern of the data symbols 310 and pilot symbols 320 in the received data slot 300 should be identical with a corresponding pattern of data symbols 210 and pilot symbols 220 in the transmitted data slot 200 (setting aside the issue of bit errors due in the received signal).

However, because of the fading nature of the transmission medium, the amplitude and phase of the data symbols 310 and pilot symbols 320 in the received data slot 300 will not be constant. In particular, the amplitude and phase of the data symbols 310 and pilot symbols 320 will form an amplitude profile similar to 330 that varies in magnitude.

In addition to performing a DFT function, the signal DFT circuit 140 is also capable of extracting the pilot symbols from the received encoded symbol stream, based on the receiver's foreknowledge of where in the data slot the pilot symbols will appear. This allows the extraction of the pilots symbols from the output of the signal DFT circuit 140.

The channel estimation circuit 150 then receives the pilot signal from the signal DFT circuit 140 and performs a channel estimation operation to generate a channel estimation signal. By comparing know data from an actual received data slot 300 (i.e., the pilot data 320) with known parameters of the transmission data slot 200 (i.e., with respect to the pilot data 200), the channel estimation circuit 150 can estimate qualities of the transmission channel.

The demodulator 145 then takes the received encoded symbol steam and the channel estimation signal and demodulates the received encoded symbol stream to extract a set of receive data that should be essentially the same as the transmit data provided to the modulator 105 (allowing for a certain amount of corrupted data during transmission due to noise, interference and small inaccuracy in various receiver blocks).

The demodulator 145 will then use the channel estimation signal from the channel estimation circuit 150 to adjust the received data constellation to remove the effect of the multipath fading channel. One way to do this is to multiply the encoded symbol stream by the inverse of the channel estimation signal.

Channel Estimation Circuit

As noted above with respect to FIG. 1, the channel estimation circuit 150 receives a pilot signal including information relating to the pilot samples in the received encoded symbol stream, and uses that information to generate a channel estimation signal. FIG. 4 is a block diagram of the channel estimation circuit of FIG. 1, according to disclosed embodiments. As shown in FIG. 4, the channel estimation circuit 150 includes an extension circuit 410, an estimator inverse discrete Fourier transform (IDFT) circuit 420, a filter 430, a zero insertion circuit 440, an estimator discrete Fourier transform (DFT) circuit 450, a reduction circuit 460, a noise estimator 470, and a threshold set circuit 480.

An exemplary operation of the channel estimation circuit 150 of FIG. 4 is shown by the graphs of FIGS. 5 to 10, which illustrate the signals at various points through the channel estimation circuit 150 for one embodiment. In the specific embodiment shown in FIGS. 5 to 10, 150 pilot symbols are provided in a data slot.

In operation, the extension circuit 410 receives the pilot signal from the signal DFT circuit 140 and extends the front and the back side of the pilot signal's envelope by a set amount to generate an extended frequency domain signal. This extension operation can be an extension that simply repeats the first and last values, or it can involve a more complicated extension based on some continuous function (i.e., a function that is differentiable over its entire duration).

In some embodiments, the extension can provide that the resulting extended frequency domain signal output from the extension circuit 410 have a number of samples that will allow the estimator IDFT 420 to be an IFFT.

FIG. 5 is as plot of a pilot signal provided to the extension circuit of FIG. 4, according to disclosed embodiments. As shown in FIG. 5, the pilot signal 510 is a plot of the amplitudes of the pilot symbols for a given data slot, and provides a rough estimate of the channel properties by showing samples taken throughout the data slot.

FIG. 6 is as graph of an output signal from the extension circuit of FIG. 4, according to disclosed embodiments. As shown in FIG. 6, the extension circuit 410 adds a beginning extension signal 620 to the beginning of the pilot signal 510 and an ending extension signal 630 to the end of the pilot signal 510 to generate the extended frequency domain signal 610.

In this embodiment the beginning extension signal 620 and the ending extension signal 630 both have a length of 53 symbols, giving a total length for an extended frequency domain signal 610 of 256 symbols (i.e., a power of two). However, the lengths of the beginning extension signal 620 and the ending extension signal 630 could vary in alternate embodiments. The total length of the beginning extension signal 620 and the ending extension signal 630 can be chosen based on a number of criteria. However, if the lengths of the beginning extension signal 620 and the ending extension signal 630 are chosen such that the length of the resulting frequency domain extended signal 610 is a power of two, the estimator IDFT 420 can be implemented as a radix-2 inverse fast Fourier transform (IFFT), which can simplify the circuit design significantly compared to other IDFT designs. Alternate embodiments could employ other radix values, however.

In the particular embodiment of FIG. 6, the beginning extension signal 620 is a linear extension of the first value of the pilot signal 510, and the ending extension signal 630 is a linear extension of the last value of the pilot signal 510. By extending the pilot signal 510 at the beginning and end, the extension circuit 410 creates an extended signal that does not have any discontinuities close to the beginning and end of the pilot signal 510. In this particular embodiment the length of the beginning extension signal 620 and the ending extension signal 630 should be long enough that any effect from discontinuities at the beginning of the beginning extension signal 620 or at the end of the ending extension signal 630 will have settled before the portion corresponding to the pilot signal 510 is analyzed.

In alternate embodiments the beginning extension signal 620 and the ending extension signal 630 this can be changed from a flat linear extension to an alternate signal formula, e.g., a non-linear signal shape, i.e., continuous function (differentiable at all points). In general, any signal shape that avoids the presence of discontinuities along its length can be used. In one particular set of embodiments the shape of the beginning extension signal 620 and the ending extension signal 630 can be selected such that these two end points of these signal portions arrive at the same amplitude and have a linear phase change. This can avoid discontinuities at the edges as well as across the beginning extension signal 620 and the ending extension signal 630, by making sure that there is no discontinuity where a beginning extension signal 620 and an ending extension signal 630 meet.

The estimator IDFT 420 performs an IDFT operation on the extended frequency domain signal from the extension circuit 410 to convert it from the frequency domain into the time domain to generate the time domain signal. The estimator IDFT 420 should have a length equal to a length of the total frequency domain signal at the output of 410.

Figure 7:
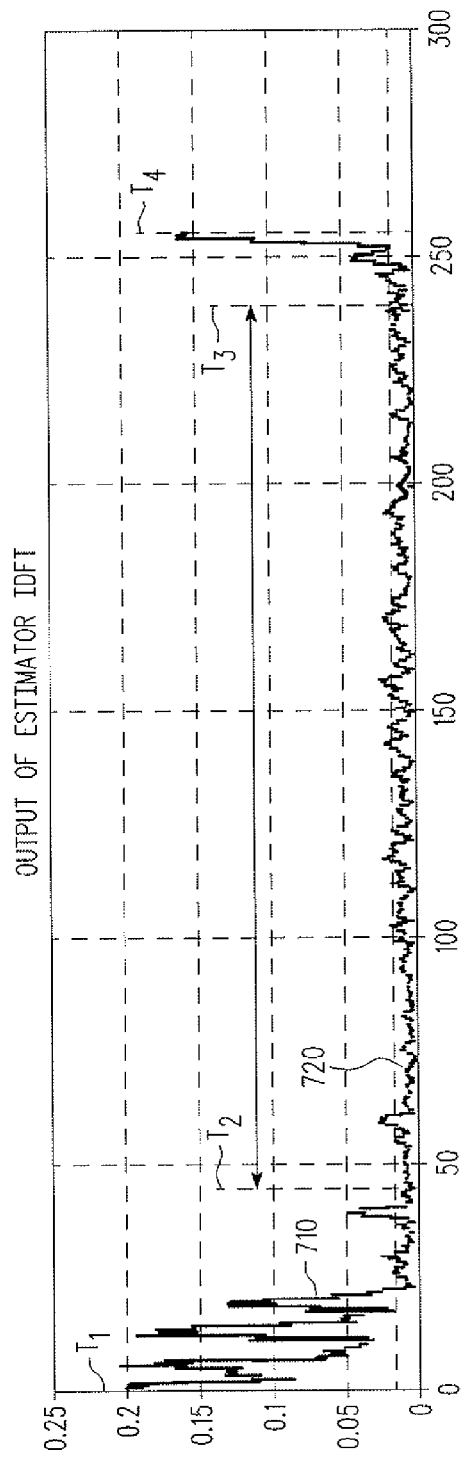
FIG. 7 is as graph of an output signal from the estimator IDFT circuit of FIG. 4, according to disclosed embodiments.

FIG. 7 is as graph of an output signal from the estimator IDFT circuit of FIG. 4, according to disclosed embodiments. As shown in FIG. 7, the signal output from the estimator IDFT 420 to the filter 430 is a time domain version of the extended frequency domain signal 610 output from the extension circuit 410 shown in FIG. 6 (i.e., it's an extended time domain signal 710). Because of the nature of an IDFT operation, the extended time domain signal 710 can be considered a "sampled" channel impulse response.

The location up to which dominant channel taps are present in the estimator IDFT 420 output can be referred to as $T_2$. This represents the dominant multipath of the time domain channel impulse response. Its length in time is equal to the OFDM cyclic prefix and is pre-determined based on the length of the cyclic prefix.

Since the extended time domain signal 710 is simply a converted version of the extended frequency domain signal from FIG. 6, the extended time domain signal 710 also has an effective length of 256 symbols.

The filter 430 performs a filtering operation on the extended time domain signal 710 output from the estimator IDFT 420 to produce a filtered signal based on a threshold set value provided by the threshold set circuit 480. In the disclosed embodiment this is a non-linear filtering process. Filtering will help improve the accuracy of the channel estimate by filtering out noise from the pilot signal. It is performed based on a noise threshold received from the threshold set circuit 480.

Figure 8:
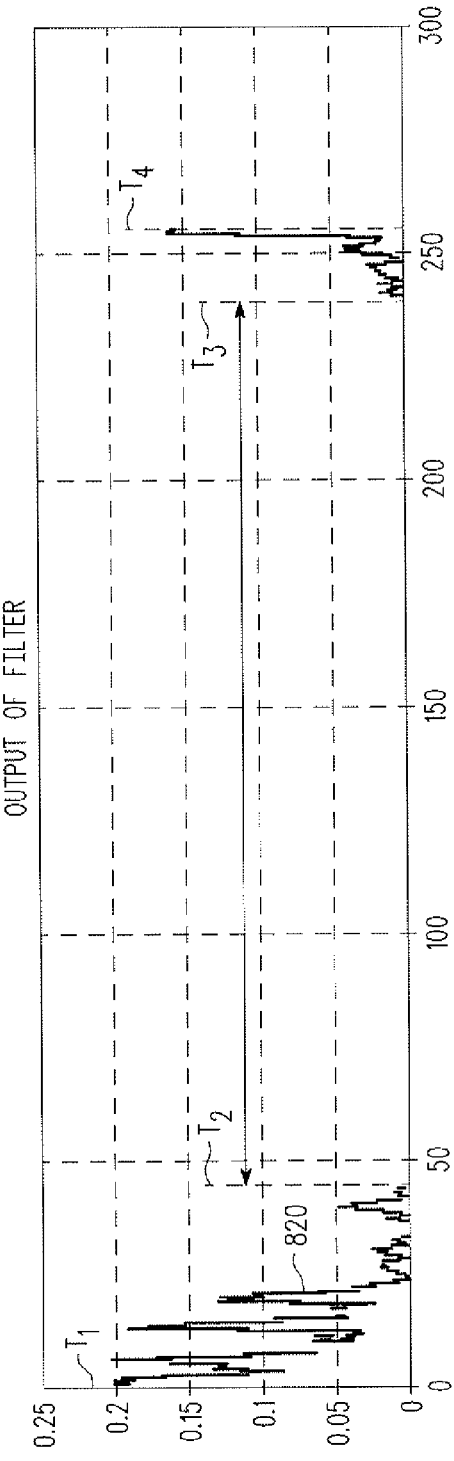
FIG. 8 is as graph of an output signal from the filter circuit of FIG. 4, according to disclosed embodiments.

FIG. 8 is as graph of an output signal from the filter circuit of FIG. 4, according to disclosed embodiments. As shown in FIG. 8, the signal output from the filter 430 to the zero insertion circuit 440 is a filtered version of the extended time domain signal 710 output from the estimator IDFT 420 shown in FIG. 7.

In operation, the noise estimator 470 receives the extended time domain signal 710 and uses it to provide an estimate of the amount of noise in pilot signal to the threshold set circuit 480. It performs this operation by first computing the noise level of the extended time domain signal 710 using the portion of the extended time domain signal 710 that is beyond the dominant taps of the estimator IDFT 420 (i.e., between times $T_2$ and $T_3$). In particular, in one embodiment the noise is estimated as a variance of the extended time domain signal 710 that is beyond the dominant taps. The fact that the noise-free extended time domain signal 710 has very low/zero values beyond the dominant taps allows this noise threshold calculation.

The threshold set circuit 480 then uses the estimated amount of noise provided by the noise estimator 470 to generate a noise threshold 720, which is provided to the filter 430. This noise threshold 720 represents an estimate of the noise variance of the received signal.

The filter 430 also receives the extended time domain signal 710 and uses the threshold value 720 to set all points in the extended time domain signal 710 below the threshold 720 to zero or some very low value in the region from the sample at time $T_1$ to the sample at time $T_2$, as well as in the region from the sample time $T_3$ to the sample time $T_4$. In alternate embodiments a multiple of the threshold 720 can be used for filtering, rather than the exact value. In addition, the filter 430 also sets all values in the extended time domain signal 710 that are between $T_2$ and $T_3$ to zero, regardless of whether they are above or below the threshold 720.

By "zeroing out" portions of the extended time domain signal 710, as described above, the filter 430 performs the "nonlinear" filtering operation and generates a filtered signal 810.

Additional linear filtering can be performed in other embodiments on the dominant taps to reduce their noise. For example, in some embodiments, the bandwidth of the additional filtering operation can be a function of the previously computed noise threshold 720.

The zero insertion circuit 440 receives the filtered signal 810 from the filter 430, splits it in half, and inserts a zeroed signal between the two halves (i.e., inserts a number of zero values between the two halves). This allows the ideal interpolation. The number of inserted zeros depends on the order of interpolation required. In an embodiment that uses 2× interpolation the number of inserted zeros equals the number of pilots. If 3× interpolation was required, then the number of zeros would be twice the number of pilots such that sum of pilots and zeros would equal three times the original number of pilots. Higher orders of interpolation are possible within the restrictions of the Nyquist sampling rate.

Figure 9:
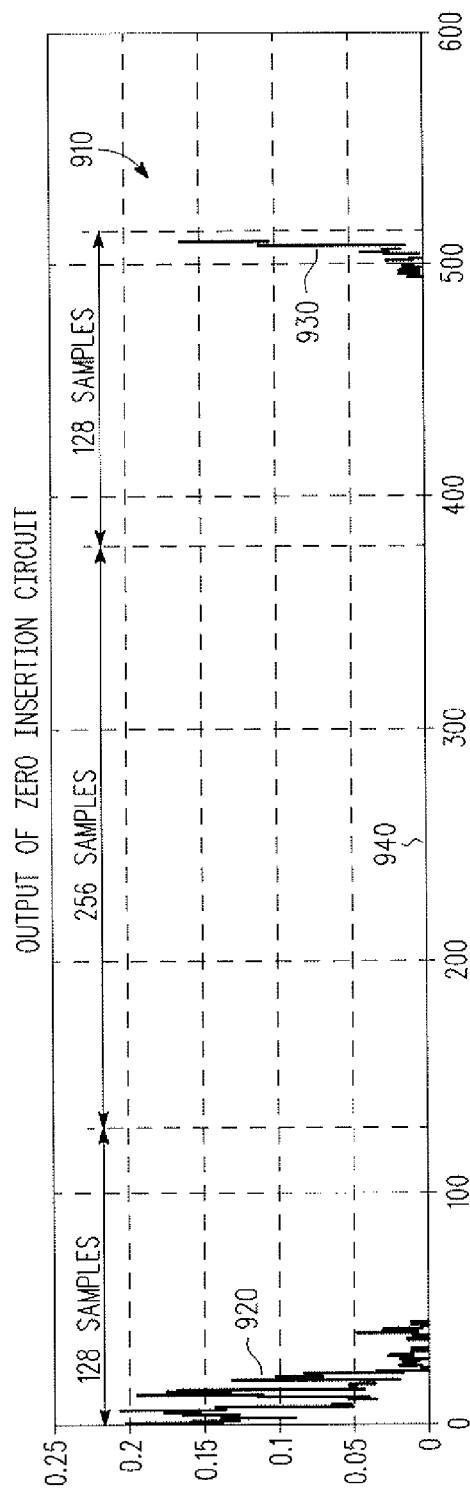
FIG. 9 is as graph of an output signal from the zero insertion circuit of FIG. 4, according to disclosed embodiments.

FIG. 9 is as graph of an output signal from the zero insertion circuit of FIG. 4, according to disclosed embodiments. As shown in FIG. 9, an expanded time domain signal 910 results from the filtered signal 810 being split into a first signal half 920 and a second signal half 930 by the zero insertion circuit 440, and then having a zero signal portion 940 of zero value placed between the first and second signal halves 920 and 930.

In the disclosed embodiments of FIG. 9, the zero signal portion 940 has the same number of samples as the filtered signal 810 since this embodiment employs 2× interpolation. In one particular embodiment the filtered signal 810 is of length 256. This means that the first and second signal halves 920 and 930 in this embodiment are both 128 samples, and the zero signal portion 940 is 256 samples in length. In general the number of inserted zeros depends on the order of interpolation required, and the length of the estimator DFT 450 depends on the total length output of the zero insertion circuit 440.

In operation, the estimator DFT 450 performs a discrete Fourier transform on the time domain signal 910 to convert the time domain expanded signal 910 from the time domain to frequency domain, thus creating a frequency domain expanded signal 1010. As with the IDFT 420, the DFT 450 can be implemented as a fast Fourier Transform (FFT) using a variety of radix values.

Figure 10:
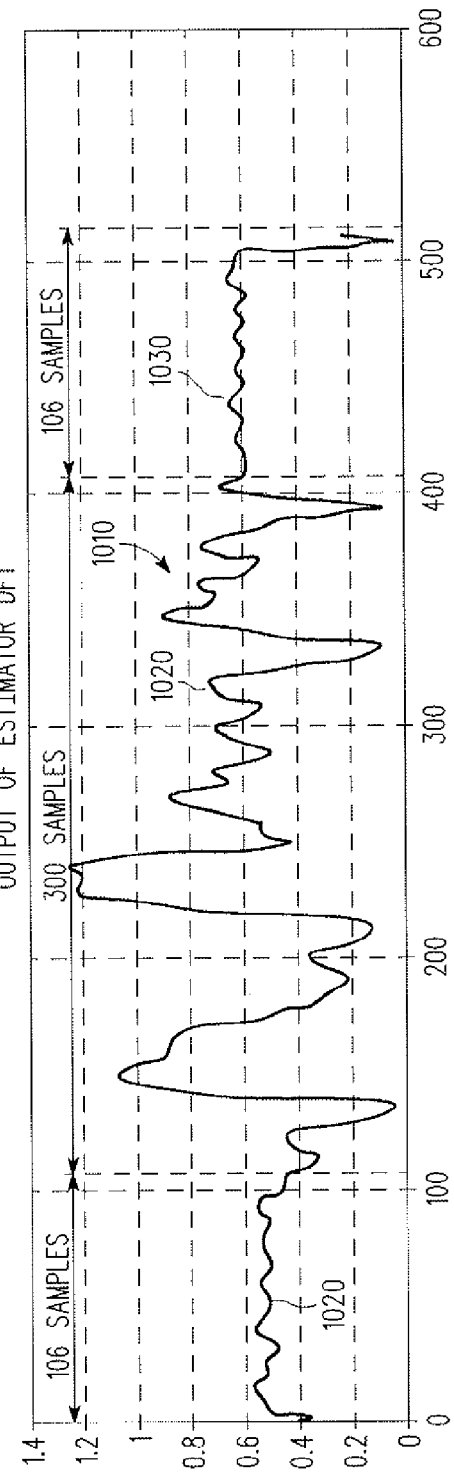
FIG. 10 is as graph of the output signal from the estimator discrete Fourier transform circuit of FIG. 4, according to disclosed embodiments.

FIG. 10 is a graph of the output signal from the estimator DFT circuit of FIG. 4, according to disclosed embodiments. The frequency domain expanded signal 1010 includes a center portion 1020, a front portion 1030, and an end portion 1040.

In particular, the center portion 1020 provides an estimate of the pilot signal 510, while the front and end portions 1030 and 1040 correspond to the beginning and ending extension signals 620 and 630, respectively. However, because of the increase in the sample size due to interpolation by two times, the output of the estimator DFT 450 is twice the size of the output of the extension circuit 410. In particular, the center portion 1020 is double the length of the pilot signal 510 (i.e., it is 300 samples long rather than 150 samples).

The reduction circuit 460 reduces the size of the frequency domain expanded signal 1010 by eliminating the front and end portions 1030 and 1040, leaving just the center portion 1020 as a channel estimation signal 1110.

Figure 11:
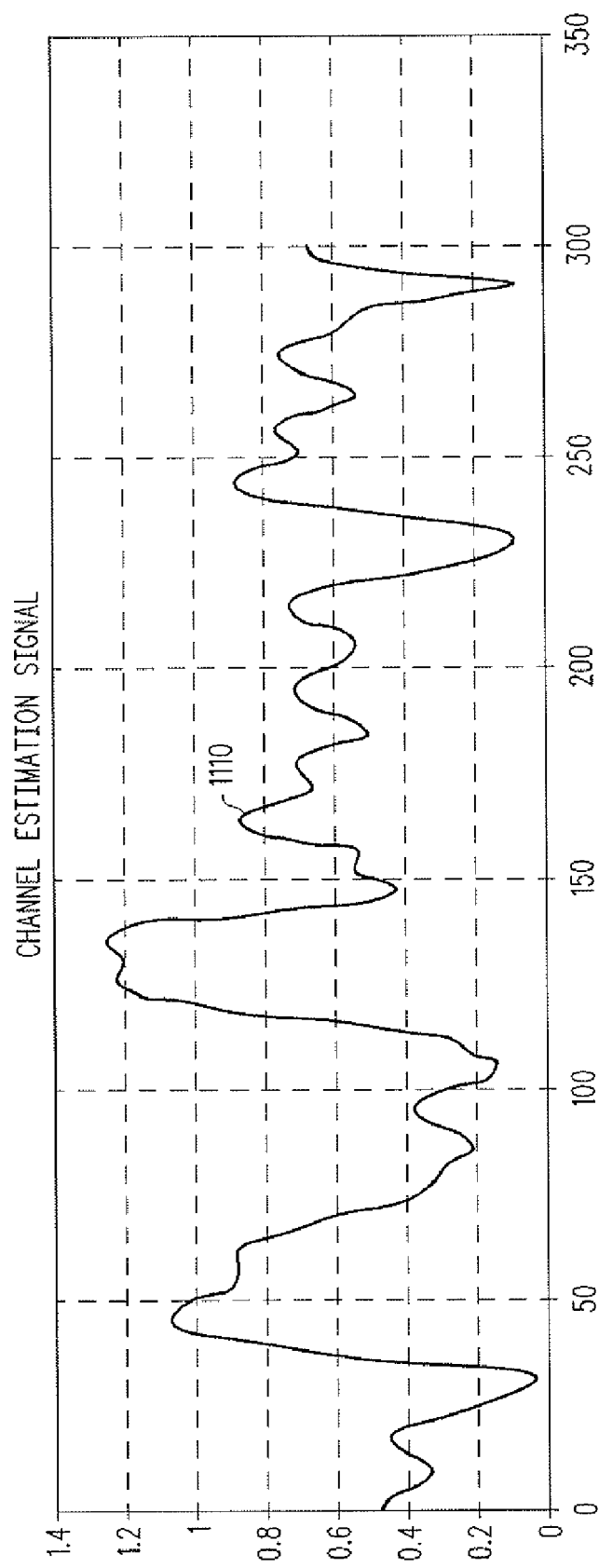
FIG. 11 is as graph of the channel estimation signal of FIG. 4, according to disclosed embodiments.

FIG. 11 is as graph of the channel estimation signal of FIG. 4, according to disclosed embodiments. As shown in FIG. 11, the channel estimation signal 1110 corresponds to the center portion 1020 of FIG. 10.

In general, a channel estimator is provided that includes: an extension circuit configured to receive a pilot signal, to add a front extension signal to a front of the pilot signal, and to add a back extension signal to a back of the pilot signal, to create a first intermediate signal, the front extension signal being an extension of a first symbol in the pilot signal, and the back extension signal being an extension of a last symbol in the pilot signal; an inverse discrete Fourier transform circuit configured to perform an inverse discrete Fourier transform function on the first intermediate signal to generate a second intermediate signal; a signal processing element configured to perform one or more operations on the second intermediate signal to generate a third intermediate signal; a discrete Fourier transform circuit configured to perform a discrete Fourier transform function on the third intermediate signal to generate a fourth intermediate signal; and a reduction circuit configured to truncate a front end of the fourth intermediate signal and a back end of the fourth intermediate signal to generate a channel estimation signal.

The front extension signal, and the back extension signal may each include one or more symbols selected from a constellation of available symbols.

The signal processing element may include a zero insertion circuit configured to split the second intermediate signal in half, and to insert a zeroed signal having an amplitude of approximately zero between the a front half and a back half of the second intermediate signal to create the third intermediate signal. The signal processing element may also include a non-linear filter for performing a filtering operation on the second intermediate signal to generate the third intermediate signal. The signal processing element may also include both a non-linear filter for performing a filtering operation on the second intermediate signal to generate a fifth intermediate signal; and a zero insertion circuit configured to split the fifth intermediate signal in half, and to insert a zeroed signal having an amplitude of approximately zero between the a front half and a back half of the fifth intermediate signal to create the third intermediate signal.

The channel estimator may further include a noise estimator configured to provide an estimation of a noise level in a received signal; and a threshold set circuit configured to provide threshold level to control the operation of the filter based on the estimation of noise level. The threshold level may be between −3 dB and +3 dB around the estimated noise level for the received signal.

The front extension signal may be a first essentially flat linear signal having a first constant value equal to a first value in the pilot signal, and the back extension signal may be a second essentially flat linear signal having a second constant value equal to a last value in the pilot signal. The front extension signal and the back extension signal may be of equal size.

A symbol length of the first intermediate signal may be such that the inverse discrete Fourier transform circuit can be an inverse fast Fourier transform circuit. Likewise, a symbol length of the third intermediate signal may be such that the discrete Fourier transform circuit can be a fast Fourier transform circuit.

The pilot signal may include a plurality of pilot symbols received in a data slot along with a plurality of data symbols, and a frequency of the pilot symbols as compared to a number of total symbols in the data slot may be above or approximately equal to a Nyquist sampling rate.

The channel estimator may be implemented in one of an integrated circuit or software.

Channel Estimation Method

Figure 12:
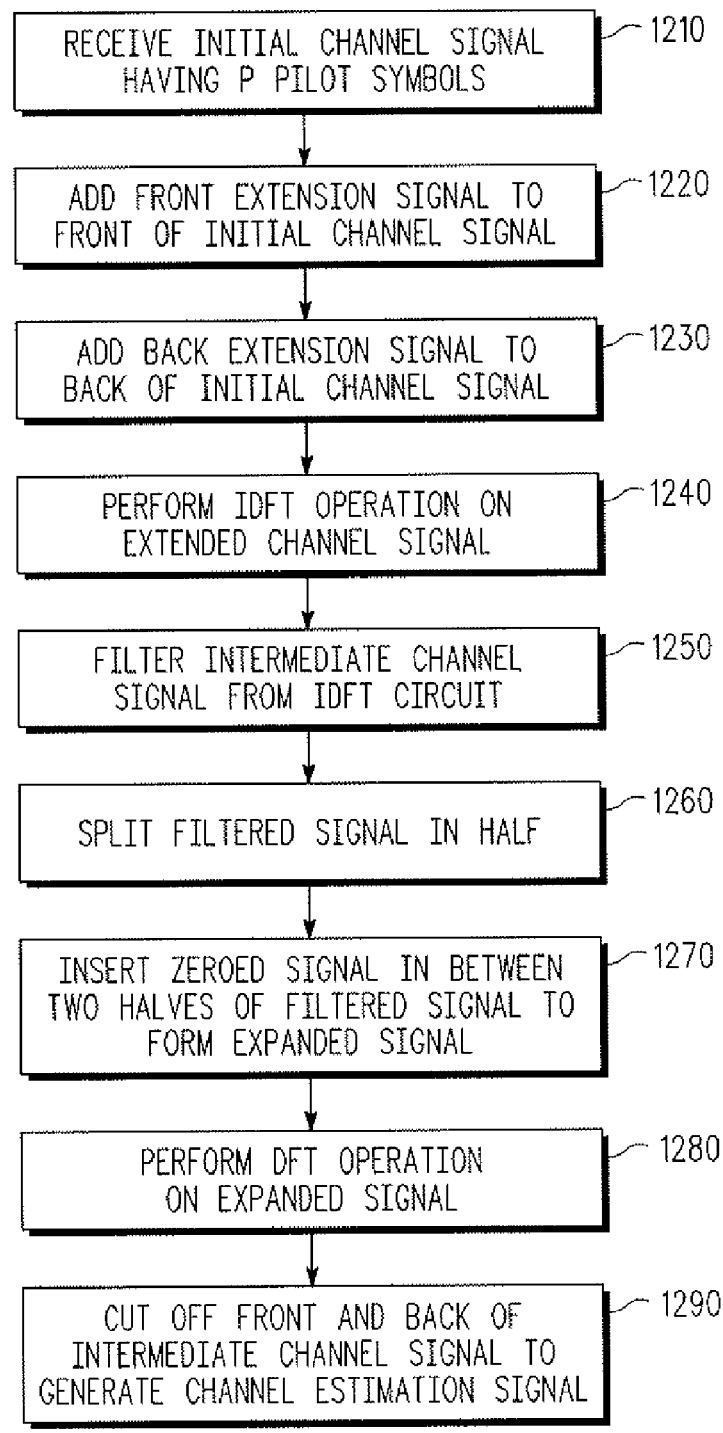
FIG. 12 is a flow chart illustrating the operation of the channel estimation circuit of FIG. 4, according to disclosed embodiments.

FIG. 12 is a flow chart illustrating the operation of the channel estimation circuit of FIG. 4, according to disclosed embodiments.

As shown in FIG. 12, the method begins when the channel estimation circuit 150 receives a pilot signal 510 including P pilot signals. (1210)

The channel estimation circuit 150 then adds a beginning extension signal 620 the front of the pilot signal 510 (1220), and an ending extension signal 630 to the back of the pilot signal 510 (1230). The beginning extension signal 620, pilot signal 510, and ending extension signal 630 together form an extended frequency domain channel signal.

Then the channel estimation circuit 150 performs an IDFT operation on the extended frequency domain channel signal to convert it from the frequency domain to the time domain and generate an extended time domain signal. (1240)

The channel estimation circuit 150 then filters the extended time domain signal according to a set filtering operation to generate a filtered signal (e.g., as described above with respect to the filter 430). (1250)

The channel estimation circuit 150 then splits the filtered in half (1260) and inserts a zeroed signal in between the two halves to form an expanded time domain signal (1270).

Then the channel estimation circuit 150 performs a DFT operation on the expanded time domain signal to convert it from the time domain to the frequency domain and generate an expanded frequency domain signal. (1280)

Finally, the channel estimation circuit 150 cuts off the front and back portions of the expanded frequency domain signal to obtain the channel estimation signal.

In general, a method of estimating a channel response is provided that includes: receiving a pilot signal comprising a series of pilot symbols; adding a front extension signal comprising one or more front symbols to a front of the pilot signal and a back extension signal comprising one or more back symbols to a back of the pilot signal, to create a first intermediate signal; performing an inverse discrete Fourier transform function on the first intermediate signal to generate a second intermediate signal; performing one or more signal processing operations on the second intermediate signal to generate a third intermediate signal; performing a discrete Fourier transform function on the third intermediate signal to generate a fourth third intermediate signal; and cutting off a front end of the fourth third intermediate signal and a back end of the fourth third intermediate signal to generate a channel estimation signal. In this method, the front extension signal is differentiable at all points of interest in the front extension signal and at a transition between the front extension signal and the pilot signal, and the back extension signal is differentiable at all points of interest in the back extension signal and at a transition between the back extension signal and the pilot signal.

The one or more signal processing operations may include splitting the first intermediate channel signal in half to form a first signal half and a second signal half; and inserting a zeroed signal having an amplitude of zero or approximately zero between the first signal half and the second signal half to create the third intermediate signal.

The pilot symbols, the front symbols, and the back symbols may all be selected from a constellation of available symbols, The front extension signal may be a first essentially flat linear signal having a first constant value equal to a first value in the pilot signal, and the back extension signal may be a second essentially flat linear signal having a second constant value equal to a last value in the pilot signal. The front extension signal may also be formed based on a continuous function that is differentiable at all point of interest over the front extension signal, and the back extension signal may be formed based on a continuous function that is differentiable at all point of interest over the back extension signal, A symbol length of the first intermediate signal for one data slot may of length such that the inverse discrete Fourier transform function can be an inverse fast Fourier transform (IFFT) function. Likewise, a symbol length of the third intermediate signal may be of length such that, the discrete Fourier transform function may be a fast Fourier transform (FFT) function.

The front extension signal and the back extension signal may be the same size. A frequency of the pilot symbols in the data slot may be above or approximately equal to a Nyquist sampling rate The method may further include performing a non-linear filtering operation on the first intermediate channel signal before the zero insertion operation in the first intermediate channel signal.

The method may further include determining an estimation of a noise level in a received signal containing the pilot signal; and setting a threshold level to control the operation of the filter based on the estimation of noise level.

The method may be implemented in one of an integrated circuit or software.

More specifically, a method of estimating a channel response is provided that includes: receiving an initial channel signal comprising a series of P pilot symbols; adding a front extension signal comprising a series of F front symbols to a front of the initial channel signal; adding a back extension signal comprising a series of B back symbols to a back of the initial channel signal, to create an extended channel signal; performing an inverse discrete Fourier transform function on the extended channel signal at a sampling length of (P+F+B) to generate a first intermediate channel signal; splitting the first intermediate channel signal in half; inserting a signal having an effective length of Z symbols and an amplitude of zero or approximately zero between the two halves of the first intermediate channel signal to create an expanded channel signal; performing a discrete Fourier transform function on the expanded channel signal at a sampling length of (P+F+B+Z) to generate a second intermediate channel signal; and cutting off a front end of the second intermediate channel signal and a back end of the second intermediate channel signal to generate a channel estimation signal of length D. In this method, B, D, F, P, and Z are all integers, while F and B are both greater than 1. P identifies a number of pilot symbols in one data slot, and D identifies a number of data symbols in one data slot. The P pilot symbols, the F front symbols, and the B back symbols are all selected from a constellation of available symbols. In addition, the F front symbols are selected to be differentiable at all points of interest over the F front symbols and at a transition between the front extension signal and the initial channel signal, and the B back symbols are selected to be differentiable at all points of interest over the B back symbols and at a transition between the back extension signal and the initial channel signal.

In one embodiment, the F front symbols may be selected to be the same as the first pilot symbol in the P pilot, and the B back symbols may be selected to be the same as the last pilot symbol in the P pilot symbols. Alternatively, the F front symbols and the B back symbols may have values based on a continuous function that bridges the first and the last sample of the original data, the continuous function being one that is differentiable at all point of interest. F and B may be equal.

The quantity (P+F+B) may be a power of two or other size which would allow the discrete Fourier transform function to be a fast Fourier transform function. Likewise, the quantity (P+F+B+D) may be a power of two or other size which would allow the inverse discrete Fourier transform function to be an inverse fast Fourier transform function.

Figure 13:
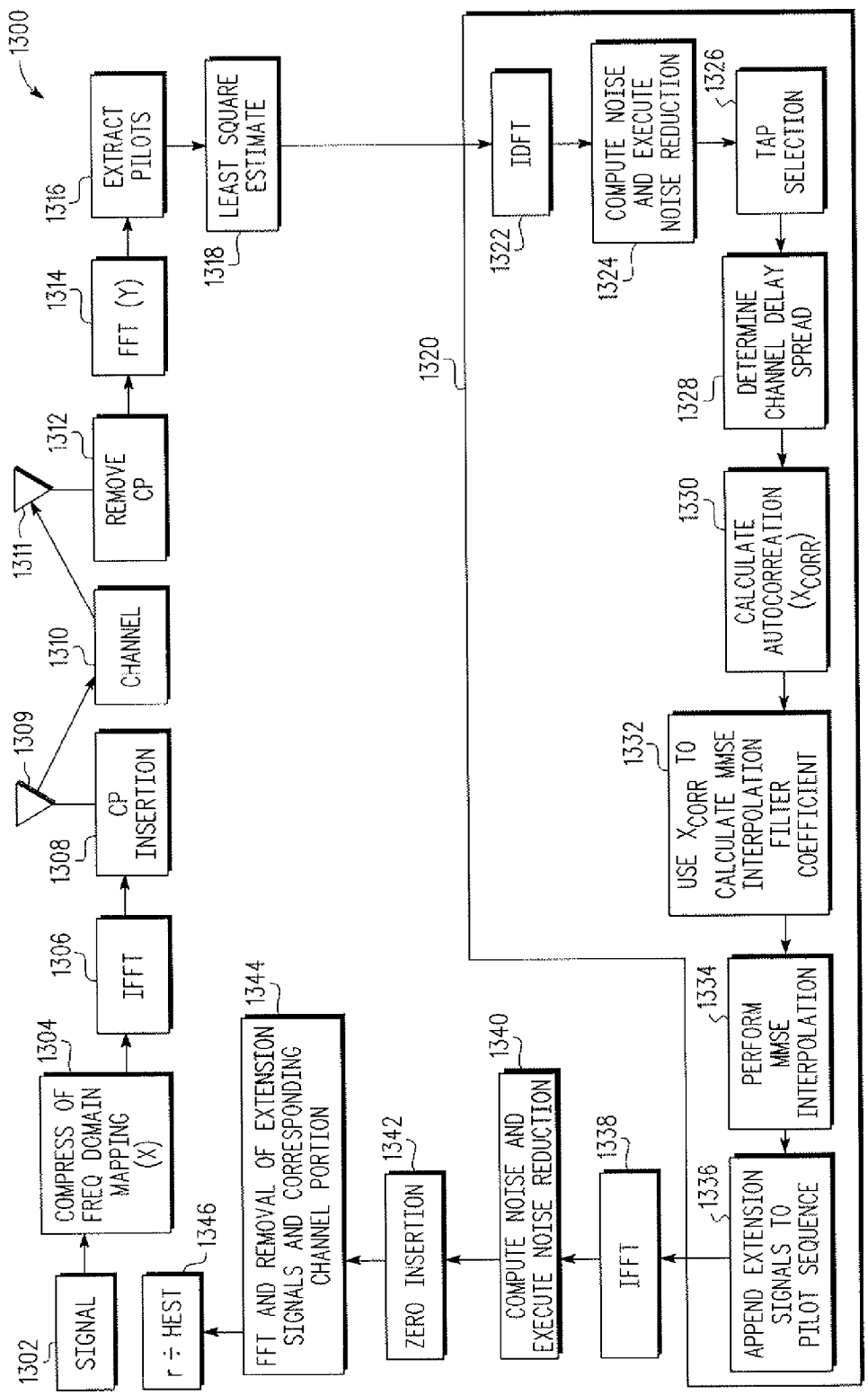
FIG. 13 is a flow chart illustrating a method 1300 of wireless communication between two devices, wherein the wireless communication includes channel estimation.

FIG. 13 is a flow chart illustrating a method 1300 of wireless communication between two devices, wherein the wireless communication includes channel estimation. The method can be used between any wireless devices, such as a base station and a cellular phone. The first device (e.g., a base station) generates a signal in step 1302. In step 1304, the signal is compressed into frequency domain mapping which creates an original signal X that will be transmitted to another device. The modulator 105 (FIG. 1) can perform the signal compression in step 1304. Pilots are added to the signal during step 1304. The IFFT of the original signal X is performed in step 1306. and can be performed by the signal IDFT 110 (FIG. 1). Using the cyclic prefix addition circuit 115 (FIG. 1), for example, a cyclic prefix (CP) is added to the beginning of each packet of information in the IFFT signal from step 1306 so that the different packets can be easily deciphered after transmission. A first antennae 1309 or 120 (FIG. 1) of the first device (e.g., a base station) then transmits the original signal with the CPs through a channel (H) 1310 to a second antennae 1311 or 130 (FIG. 1) of a second device (e.g., a cellular phone). When the second device receives the original signal, the CP's are removed, for example using the cyclic prefix removal circuit 135 (FIG. 1), from the packets in step 1312, Next, a FFT of the received signal (Y) is performed in step 1314 to transfer the signal, which was transmitted in the time domain, to a frequency domain signal. For example, the signal DFT 140 (FIG. 1), which in this embodiment may be called an estimator FFT, can be used in step 1314. Once the received signal (Y) is in the frequency domain the samples with pilots are transmitted to the channel estimation circuit 150. Pilots, which are also referred to herein as pilot symbols, are extracted from the received signal (Y) in step 1316. For example, if the received signal (Y) is transmitted at 5 MHz and has 512 bins with only 300 bins being used to transmit information, the received signal (Y) may include 50 pilots and only 250 bins available for transmitting desired information (data subcarriers). Hence, the received signal (Y) may have a ratio of pilots to data (real information) of 1:6. In this embodiment, the 50 pilots would be extracted during the step 1316. Next, in step 1318, the least square (LS) estimate of the pilots, which were previously extracted, is calculated. The least square estimate, in one embodiment is the first estimate of the channel. In one embodiment, the extension circuit 410 (FIG. 4) can include circuitry for calculating the least square estimate of the pilots. The least square estimate of the pilots is the frequency domain of the channel with noise. In other words, the least square estimate (Yp/Xp) of the pilots is the pilot channel (Hp) with pilot noise (Np), which is divided by Xp. (Yp is the received signal of the pilots and Xp is the original signal of the pilots,)

Next, the process of adding extension signal 1320 begins. This process 1320 includes steps 1322 to 1336. In step 1322, the LS estimates are transferred to the time domain through IDFT to create a channel impulse response.

From the time domain of the LS estimate, i.e the channel impulse response, the noise variance is computed and noise reduction is executed in step 1324. The same process used to form the signal of FIG. 8 from that of FIG. 7 can be used. For example, anything after a predetermined time i.e the duration of the CP (e.g., 5 or 16 microseconds) can be considered noise. This noise variance is then used to determine a threshold (e.g. 3 to 6 dB above the noise variance). In step 1326, any value below this threshold is zeroed out. Also, all the values in the window T2-T3 in FIG. 7 are considered as noise and are set to zero. What remains is considered as the selected taps, i.e. the dominant taps that is considered to represents the channel in time domain. In one embodiment the signal after the step 1324 is the second estimate of the channel. A skilled artisan should appreciate that while much noise is removed from the signal after step 1324, some noise is may still be present. Thus, the noise may not be completely removed but it is reduced. After tap selection, only the dominant channel taps exist.

After tap selection, the channel delay spread is determined in step 1328. The channel delay spread is the sum of two time intervals. The first interval is the difference between the last and the first taps locations in region T1-T2 and the second time interval is the difference between the last and the first taps locations in region T3-T4 (as shown in FIG. 8). Using the channel delay spread, the channels frequency autocorrelation (Xcorr) is calculated in step 1330 using the following formula:

$$R_f(\Delta fl) = \sum_{m=1}^{M} |C_m|^2 e^{-j2\pi\Delta fl\tau_m},$$

where $|C_m|^{2'}$ are the tap energy, $\tau_m$ is the delays of the $m^{th}$ tap, $\Delta f$ is the frequency spacing and/is the spacing (lag) index and $R_r(\Delta fl)$ are the auto correlation values. An Xcorr value of 1 means perfect correlation of the channel between two subcarrier locations in frequency domain.

The autocorrelation is then used to calculate minimum mean square error (MMSE) filter coefficients in step 1332. The MMSE filter coefficients are computed to extrapolate the LS channel estimates (at the pilot locations) to generate the extension signal based on the first few and the last few LS channel estimates (at the pilot locations). Using these MMSE filters the least square (LS) estimates (at the pilot locations) are filtered to generate the extension signals. The extension signals provide a continuous phase change and make the LS channel estimate periodic. Hence, once the extension signals are determined they are appended (and prepended) to the LS channel estimates, which form the new LS channel estimate sequence in step 1336. In one embodiment the resulting signal after step 1336 is the third estimate of the channel. Any desired length of extension signals may be added to the LS estimate obtained form the extracted pilot signals (at the pilot locations). It is desirable that the length of extension signal be chosen in such a way that, when it is appended and prepended to the LS channel estimate the net length of the extended LS channel estimate would facilitate the use of FFTs instead of DFTs. In other words, the extended LS channel estimate length should be a power 2. In one embodiment, length 14 extension signals are added to the length 50 LS estimate (obtained using the extracted pilots) so that the combined length of the extended LS estimate is 64.

After appending (and prepending) the extension signals to the frequency domain LS channel estimates, channel estimation and interpolation can be performed. First, the IFFT function is performed on the extended LS channel estimate in step 1338 so that the channel is now in the time domain, i.e. a channel impulse response is generated. Second, noise is computed and noise reduction is executed in step 1340. Any method for computing noise and executing noise reduction in step 1324 can be used to do the same in step 1340. In one embodiment, the filter 430 (FIG. 4) is used to perform step 1340. After reducing noise and filtering, zero insertion may be performed in step 1342. The zero insertion circuit 440 (FIG. 4) may be used. In this process, zeros are added in the middle of the channel impulse response. Thus, if the combined total length of the extension signal and LS estimate is 64 and the interpolation factor 6 times, then the total number of zeros inserted are such that the length of the new zero inserted LS channel estimate is 6 times extended LS estimate (i.e 64*6−64=320). Next FFT is performed and the channel estimates corresponding to the extension signal are removed in step 1344. The reduction circuit 460 (FIG. 4) may be used for step 1344. (The estimator DFT 450 (FIG. 4) may not be present if method 1300 is used.). Step 1344 completes the channel estimation process.

Afterwards the received signal is divided by the channel estimation in step 1346 so that the received signal Y can be interpreted properly.

By using the method 1300 of FIG. 13, channel estimation performance at the edge of the OFDM(A) signal is improved. Without the presence of the extension signals the estimation method used to estimate the channel can result in loss of performance. Hence, by using channel delay spread to compute extension signals that are appended and prepended to pilots prior to channel estimation, performance is improved.

Some embodiments include the following. Item 1. A method of providing a data signal in a frequency domain corrected for distortion, comprising converting a received signal having pilots to a first signal having the pilots in the frequency domain; extracting the pilots from the first signal to obtain extracted pilots to form a second signal; using the second signal to provide a first estimate of a channel; converting the first estimate to the time domain; removing noise from the first estimate in the time domain to provide a second estimate of the channel in the time domain; determining an autocorrelation of the channel in the frequency domain using the second estimate of the channel; determining extension signals using the autocorrelation; appending the extension signals to the first estimate of the channel to obtain a third estimate of the channel; and using the third estimate to provide the data signal in the frequency domain. Item 2. The method of item 1, wherein the step of using the third estimate comprises converting the third estimate of the channel to the time domain to provide a fourth estimate of the channel; removing noise from the fourth estimate; performing zero insertion on the fourth estimate to obtain an interpolation ready signal; performing a fast Fourier transform on the interpolation ready signal whereby, in the frequency domain, interpolation occurs which provides channel information among the pilots and provides extended channel information in locations determined using the extension signals to provide a sixth estimate of the channel; removing the extension signals and the extended channel information from the sixth estimate to provide a seventh estimate of the channel; and dividing the first signal by the seventh estimate to provide the data signal. Item 3. The method of item 2, wherein the step of converting the third estimate comprises performing an inverse fast Fourier transform. Item 4. The method of item 1, wherein the step of determining the extension signals, comprises determining filter coefficients of a minimum mean square error (MMSE) filter using the autocorrelation; and performing MMSE filtering on a portion of the first estimate of the channel using the filter coefficients to determine the extension signals. Item 5. The method of item 1, wherein the step of determining the autocorrelation comprises performing a tap selection on the second estimate; and determining a channel delay spread based on the tap selection. Item 6. The method of item 5, wherein the step of determining the autocorrelation assumes a uniformly distributed power delay profile. Item 7. The method of item 5, wherein the step of determining the autocorrelation further comprises using the channel delay spread to calculate the autocorrelation. Item 8. The method of item 1, wherein: the step of using the second signal is further characterized by obtaining a least square estimate. Item 9. The method of item 1, wherein the step of extracting the pilots is further characterized as providing a number of extracted pilots; and the step of determining extension signals is further characterized as providing a length of extension signals that when added to the length of least square estimates obtained form the extracted pilots equals a number that is a power of an integer. Item 10. The method of item 9, wherein the step of determining extension signals is further characterized by the integer being two. Item 11. The method of item 9, wherein the step of using the third estimate comprises performing an inverse fast Fourier transform; and performing a fast Fourier transform. Item 12. The method of item 1, further comprising generating a first frequency domain signal having pilots; converting the first frequency domain signal to a first time domain signal; transmitting the first time domain signal using a transmit antenna; and receiving the first time domain signal through a receive antenna, wherein the first time domain signal as received through the receive antenna is distorted by the channel and is the received signal.

Item 13. A method of providing a resultant frequency domain signal based on a time domain signal having pilots useful in estimating a channel through which the time domain signal traveled, comprising obtaining an input frequency domain signal derived from the time domain signal; providing a first estimate of the channel using pilots from the input frequency domain signal; determining an autocorrelation based on the first estimate of the channel; adding extension signals to the first estimate of the channel based on the autocorrelation to obtain a second estimate of the channel; using, which includes performing an inverse fast Fourier transform and a fast Fourier transform, the second estimate of the channel to obtain a third estimate of the channel; and using the third estimate of the channel on the input frequency domain signal to provide the resultant frequency domain signal. Item 14. The method of item 13, wherein the step of determining the autocorrelation comprises: determining a power delay profile of the channel based on the first estimate; and calculating the autocorrelation based on the power delay profile. Item 15. The method of item 13, wherein the step of determining the autocorrelation comprises determining a channel delay spread based on the first estimate; and calculating the autocorrelation based on the channel delay spread. Item 16. The method of item 15, wherein the step of adding the extension signals comprises calculating minimum mean square error (MMSE) filter coefficients using the autocorrelation; and performing MMSE interpolation using the MMSE filter coefficients to determine the extension signals. Item 17. The method of item 13, wherein the step of adding extension signal is further characterized by a total the length of least square estimate and the extension signals being equal to a number that is a power of an integer.

Item 18. A circuit for providing a resultant frequency domain signal in response to a time domain signal having pilots useful in estimating a channel through which the time domain signal traveled, comprising means for obtaining an input frequency domain signal derived from the time domain signal; means for providing a first estimate of the channel using pilots from the input frequency domain signal; means for determining an autocorrelation based on the first estimate of the channel; means for adding extension signals to the first estimate of the channel based on the autocorrelation to obtain a second estimate of the channel; means for using, which includes performing an inverse fast Fourier transform and a fast Fourier transform, the second estimate of the channel to obtain a third estimate of the channel; and means for using the third estimate of the channel on the input frequency domain signal to provide the resultant frequency domain signal. Item 19. The circuit of item 18, wherein the means for determining the autocorrelation is further characterized as being for determining a channel delay spread and calculating the autocorrelation based on the channel delay spread. Item 20. The circuit of claim 19, wherein the means for adding extension signals is further characterized as being for calculating minimum mean square estimate (MMSE) filter coefficients using the autocorrelation and for performing MMSE interpolation using the MMSE filter coefficients to obtain the extension signals.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method of providing a data signal in a frequency domain corrected for distortion, comprising:
converting a received signal having pilots to a first signal having the pilots in the frequency domain;
extracting the pilots from the first signal to obtain extracted pilots to form a second signal;
using the second signal to provide a first estimate of a channel;
converting the first estimate to the time domain;
removing noise from the first estimate in the time domain to provide a second estimate of the channel in the time domain;
determining an autocorrelation of the channel in the frequency domain using the second estimate of the channel;
determining extension signals using the autocorrelation;
appending the extension signals to the first estimate of the channel to obtain a third estimate of the channel; and
using the third estimate to provide the data signal in the frequency domain.

2. The method of claim 1, wherein the step of using the third estimate comprises:
converting the third estimate of the channel to the time domain to provide a fourth estimate of the channel;
removing noise from the fourth estimate;
performing zero insertion on the fourth estimate to obtain an interpolation ready signal;
performing a fast Fourier transform on the interpolation ready signal whereby, in the frequency domain, interpolation occurs which provides channel information among the pilots and provides extended channel information in locations determined using the extension signals to provide a sixth estimate of the channel;
removing the extension signals and the extended channel information from the sixth estimate to provide a seventh estimate of the channel; and
dividing the first signal by the seventh estimate to provide the data signal.

3. The method of claim 2, wherein the step of converting the third estimate comprises performing an inverse fast Fourier transform.

4. The method of claim 1, wherein the step of determining the extension signals, comprises:
determining filter coefficients of a minimum mean square error (MMSE) filter using the autocorrelation; and
performing MMSE filtering on a portion of the first estimate of the channel using the filter coefficients to determine the extension signals.

5. The method of claim 1, wherein the step of determining the autocorrelation comprises:
performing a tap selection on the second estimate; and
determining a channel delay spread based on the tap selection.

6. The method of claim 5, wherein the step of determining the autocorrelation assumes a uniformly distributed power delay profile.

7. The method of claim 5, wherein the step of determining the autocorrelation further comprises using the channel delay spread to calculate the autocorrelation.

8. The method of claim 1, wherein:
the step of using the second signal is further characterized by obtaining a least square estimate.

9. The method of claim 1, wherein:
the step of extracting the pilots is further characterized as providing a number of extracted pilots; and
the step of determining extension signals is further characterized as providing a length of extension signals that when added to the length of least square estimates obtained form the extracted pilots equals a number that is a power of an integer.

10. The method of claim 9, wherein the step of determining extension signals is further characterized by the integer being two.

11. The method of claim 9, wherein the step of using the third estimate comprises:
performing an inverse fast Fourier transform; and
performing a fast Fourier transform.

12. The method of claim 1, further comprising:
generating a first frequency domain signal having pilots;
converting the first frequency domain signal to a first time domain signal;
transmitting the first time domain signal using a transmit antenna; and
receiving the first time domain signal through a receive antenna, wherein the first time domain signal as received through the receive antenna is distorted by the channel and is the received signal.

13. A method of providing a resultant frequency domain signal based on a time domain signal having pilots useful in estimating a channel through which the time domain signal traveled, comprising:
obtaining an input frequency domain signal derived from the time domain signal;
providing a first estimate of the channel using pilots from the input frequency domain signal;
determining an autocorrelation based on the first estimate of the channel;

adding extension signals to the first estimate of the channel based on the autocorrelation to obtain a second estimate of the channel;

using, which includes performing an inverse fast Fourier transform and a fast Fourier transform, the second estimate of the channel to obtain a third estimate of the channel; and using the third estimate of the channel on the input frequency domain signal to provide the resultant frequency domain signal.

14. The method of claim 13, wherein the step of determining the autocorrelation comprises:

determining a power delay profile of the channel based on the first estimate; and calculating the autocorrelation based on the power delay profile.

15. The method of claim 13, wherein the step of determining the autocorrelation comprises:

determining a channel delay spread based on the first estimate; and calculating the autocorrelation based on the channel delay spread.

16. The method of claim 15, wherein the step of adding the extension signals comprises:

calculating minimum mean square error (MMSE) filter coefficients using the autocorrelation; and performing MMSE interpolation using the MMSE filter coefficients to determine the extension signals.

17. The method of claim 13, wherein the step of adding extension signal is further characterized by a total length of least square estimate and the extension signals being equal to a number that is a power of an integer.

18. A circuit for providing a resultant frequency domain signal in response to a time domain signal having pilots useful in estimating a channel through which the time domain signal traveled, comprising:

means for obtaining an input frequency domain signal derived from the time domain signal;

means for providing a first estimate of the channel using pilots from the input frequency domain signal;

means for determining an autocorrelation based on the first estimate of the channel;

means for adding extension signals to the first estimate of the channel based on the autocorrelation to obtain a second estimate of the channel;

means for using, which includes performing an inverse fast Fourier transform and a fast Fourier transform, the second estimate of the channel to obtain a third estimate of the channel; and means for using the third estimate of the channel on the input frequency domain signal to provide the resultant frequency domain signal.

19. The circuit of claim 18, wherein the means for determining the autocorrelation is further characterized as being for determining a channel delay spread and calculating the autocorrelation based on the channel delay spread.

20. The circuit of claim 19, wherein the means for adding extension signals is further characterized as being for calculating minimum mean square estimate (MMSE) filter coefficients using the autocorrelation and for performing MMSE interpolation using the MMSE filter coefficients to obtain the extension signals.

* * * * *